J. H. HAMMOND, Jr.
APPARATUS FOR CONTROLLING TORPEDO FIRING.
APPLICATION FILED SEPT. 14, 1915.

1,431,140.

Patented Oct. 3, 1922.

Inventor:
John Hays Hammond, Jr.
by Emery, Booth, Janney, and Varney,
Attys.

J. H. HAMMOND, Jr.
APPARATUS FOR CONTROLLING TORPEDO FIRING.
APPLICATION FILED SEPT. 14, 1915.
1,431,140.
Patented Oct. 3, 1922.
9 SHEETS—SHEET 2.
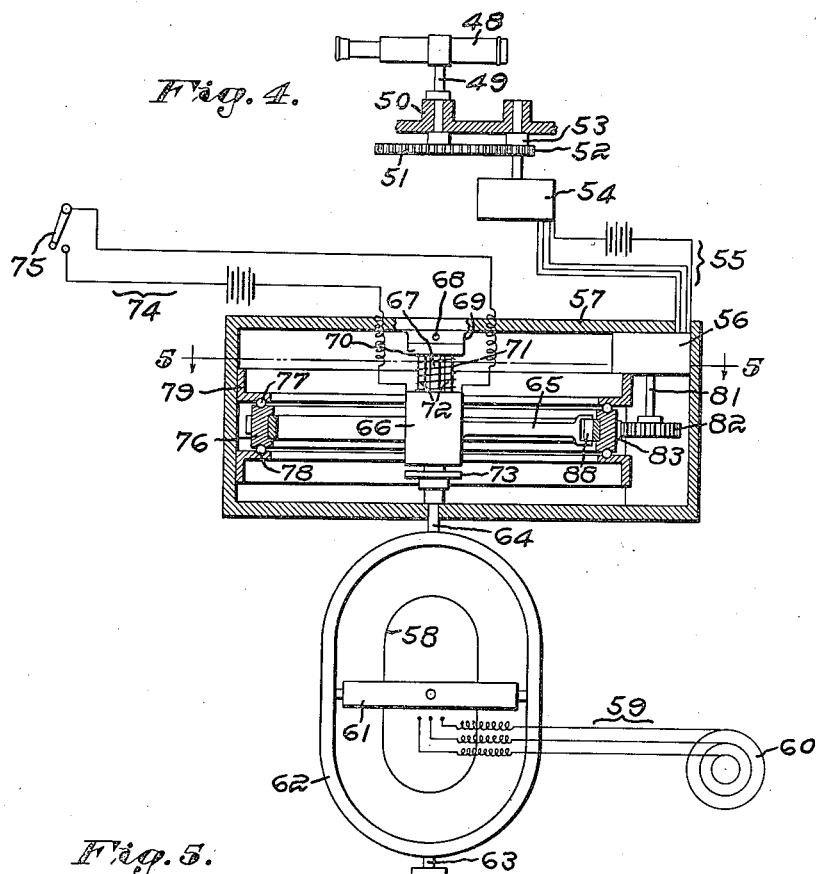
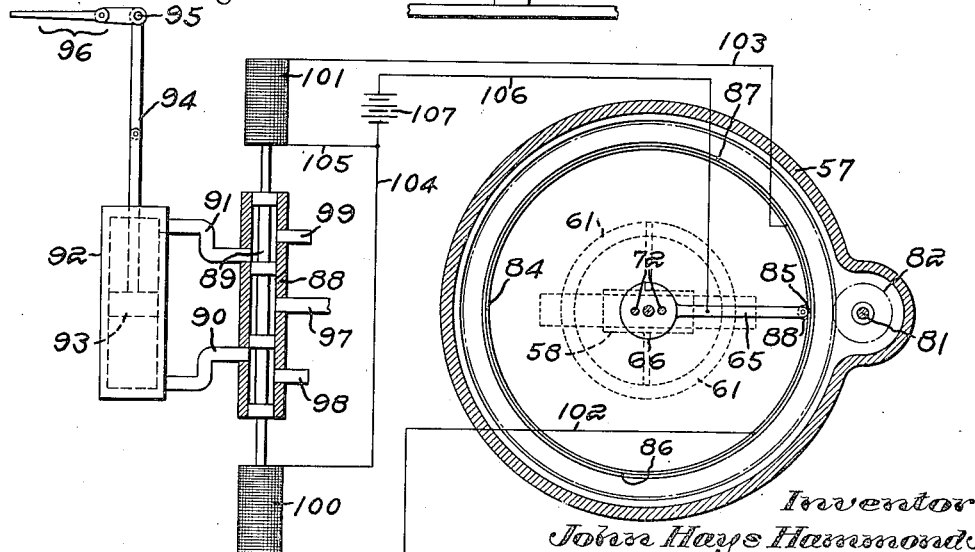
Inventor:
John Hays Hammond Jr.

J. H. HAMMOND, Jr.
APPARATUS FOR CONTROLLING TORPEDO FIRING.
APPLICATION FILED SEPT. 14, 1915.

1,431,140.

Patented Oct. 3, 1922.
9 SHEETS—SHEET 3.

Inventor:
John Hays Hammond, Jr.
by Emery Booth Janney and Varney
Attys.

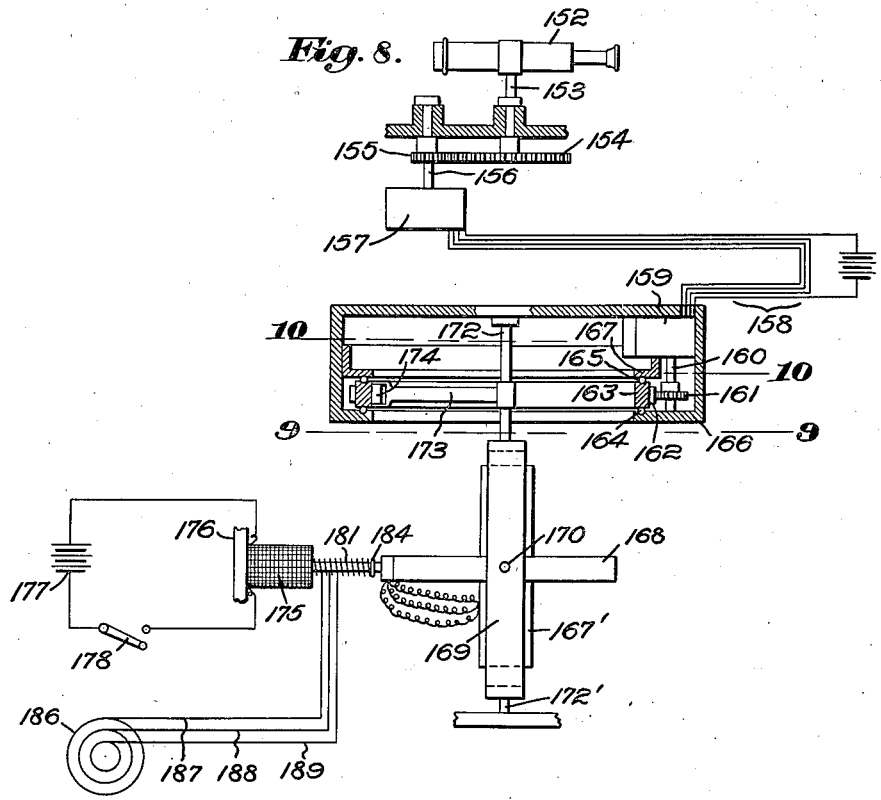
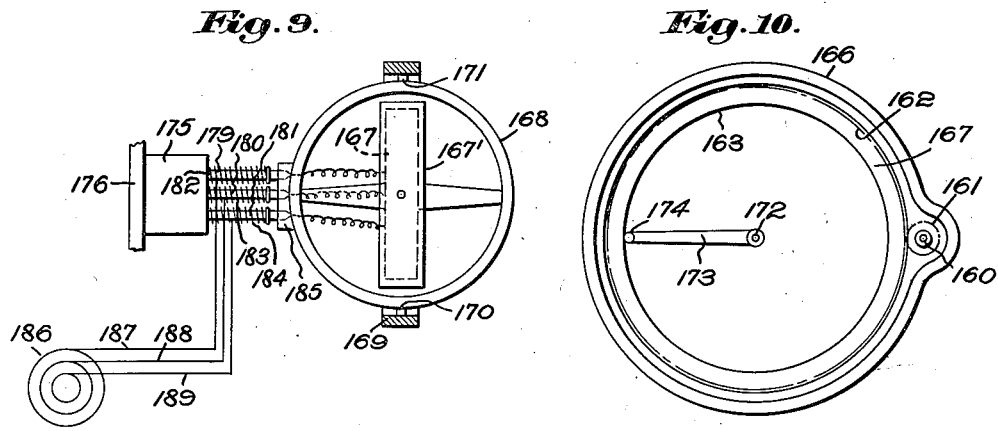

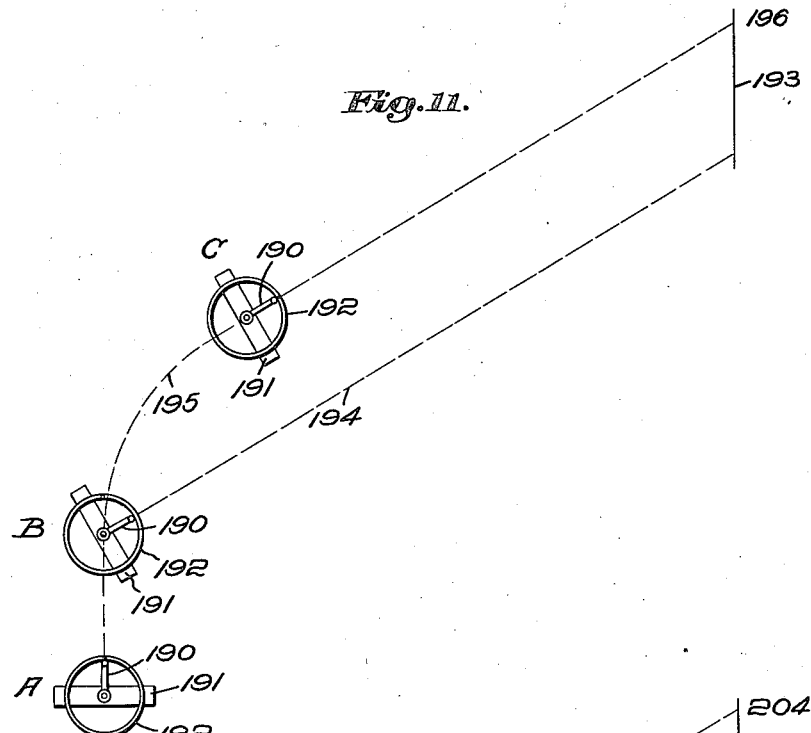
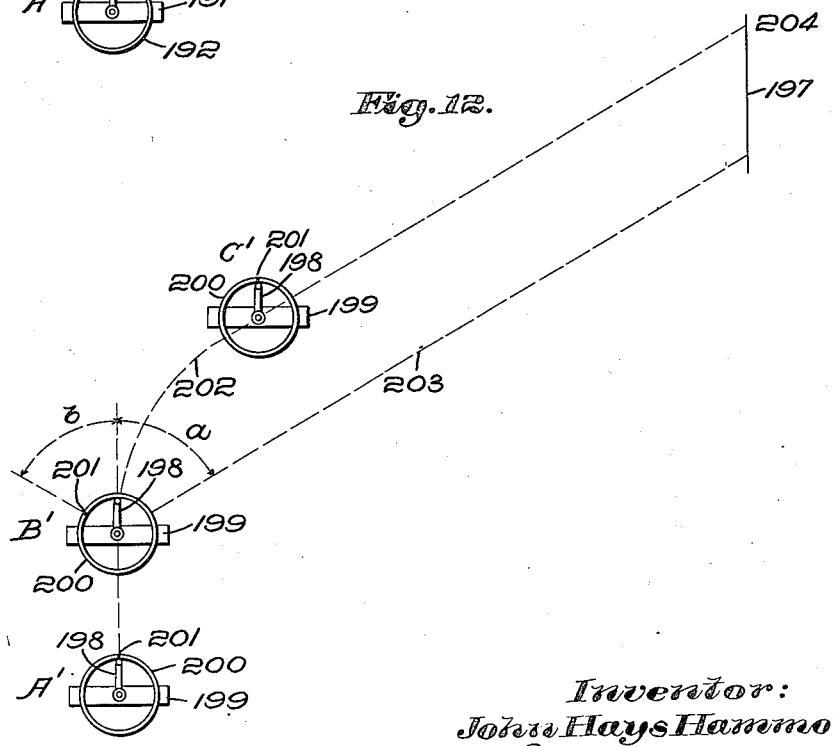

J. H. HAMMOND, Jr.
APPARATUS FOR CONTROLLING TORPEDO FIRING.
APPLICATION FILED SEPT. 14, 1915.

1,431,140.

Patented Oct. 3, 1922.

Inventor:
John Hays Hammond, Jr.
by Emery, Booth, Janney and Varney
Attys

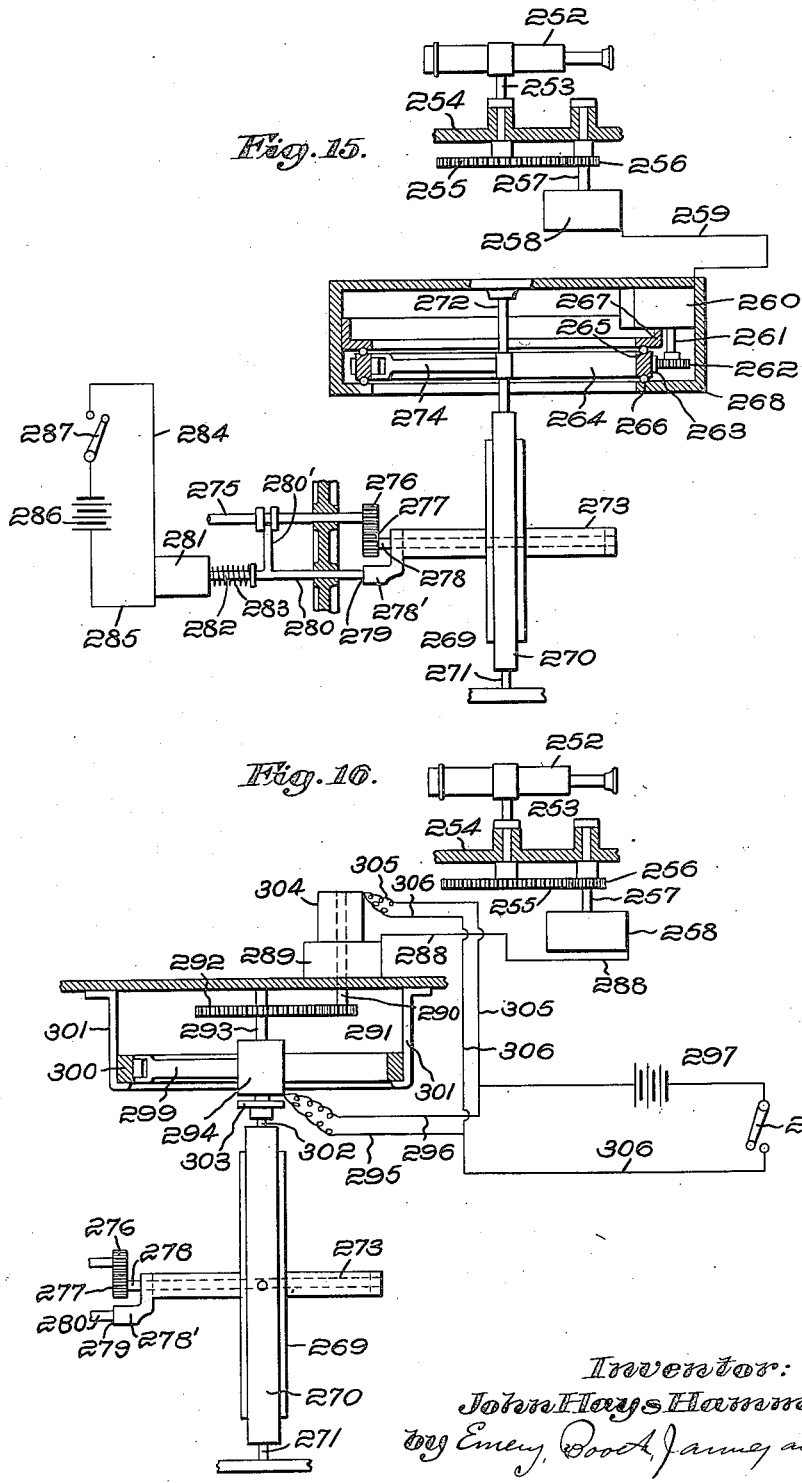

J. H. HAMMOND, Jr.
APPARATUS FOR CONTROLLING TORPEDO FIRING.
APPLICATION FILED SEPT. 14, 1915.

1,431,140.

Patented Oct. 3, 1922.
9 SHEETS—SHEET 8.

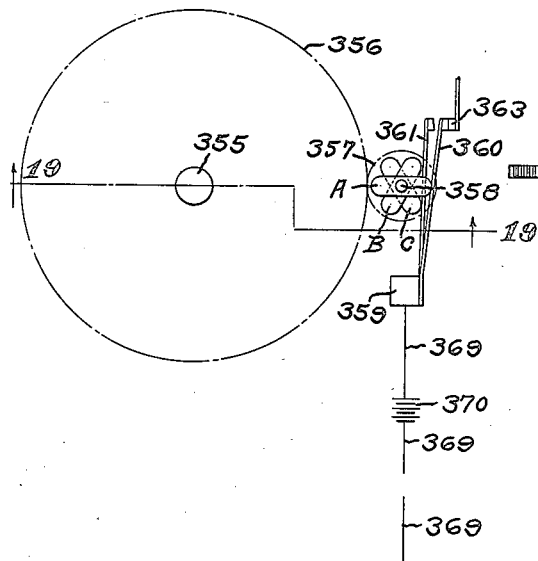
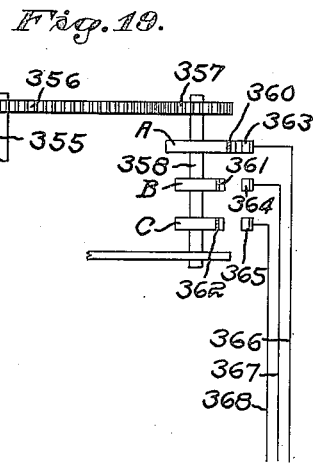
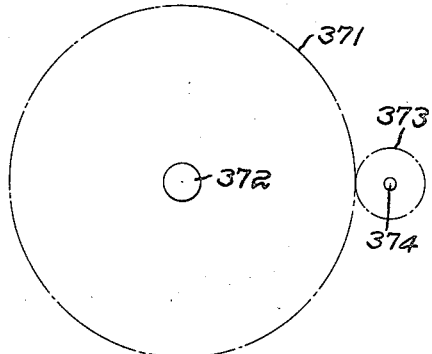
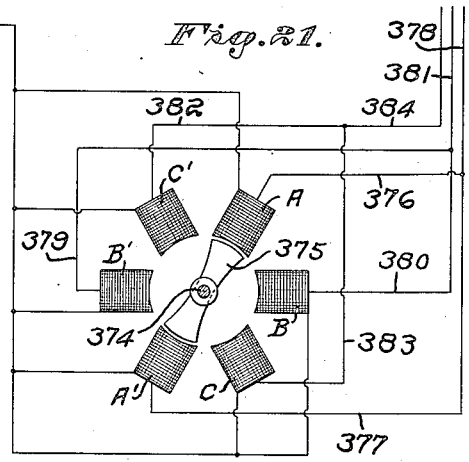

Patented Oct. 3, 1922.

1,431,140

UNITED STATES PATENT OFFICE.

JOHN HAYS HAMMOND, JR., OF GLOUCESTER, MASSACHUSETTS.

APPARATUS FOR CONTROLLING TORPEDO FIRING.

Application filed September 14, 1915. Serial No. 50,718.

*To all whom it may concern:*

Be it known that I, JOHN HAYS HAMMOND, Jr., a citizen of the United States, and a resident of Gloucester, in the county of Essex and State of Massachusetts, have invented an Improvement in Apparatus for Controlling Torpedo Firing, of which the following description, in connection with the accompanying drawings, is a specification, like characters on the drawings representing like parts.

This invention relates to apparatus for controlling torpedo firing, and in certain aspects thereof is an improvement upon the construction shown in my co-pending application Serial No. 43,879.

In order that the principle of the invention may be readily understood, I have disclosed certain embodiments thereof in the accompanying drawings, wherein—

Fig. 4 is a view similar to Fig. 1 of a further form of my invention;

Fig. 5 is a view partially in plan of the construction shown in Fig. 4 and partially in section and indicating the connections to the steering mechanism;

Fig. 8 is a view similar to Fig. 1 of still another form of my invention;

Fig. 9 is a section thereof upon the line 9—9 of Fig. 8;

Fig. 10 is a section thereof upon the line 10—10 of Fig. 8; and

Figs. 11 and 12 are diagrammatic representations or charts indicating the movements of the torpedo when controlled in accordance with the represented embodiments of my invention.

Figure 14:
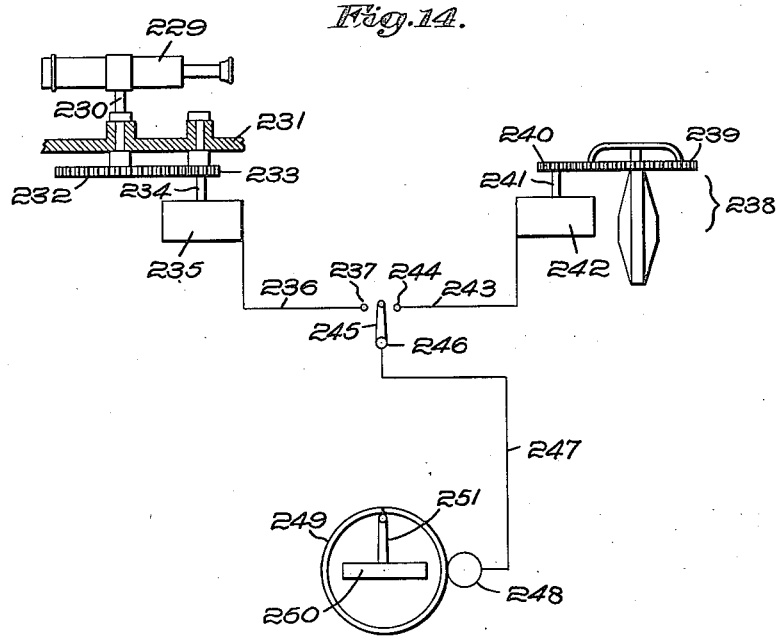

Fig. 14 diagrammatically indicates one form of means whereby the modified action of the gyroscope or other direction-maintaining means of a torpedo may be maintained for any desired length of time prior to firing the torpedo;

Fig. 15 is a view mainly diagrammatic and partially in side elevation and vertical section of another form of my invention;

Fig. 16 is a similar view of still another form of my invention; and

Figure 17:
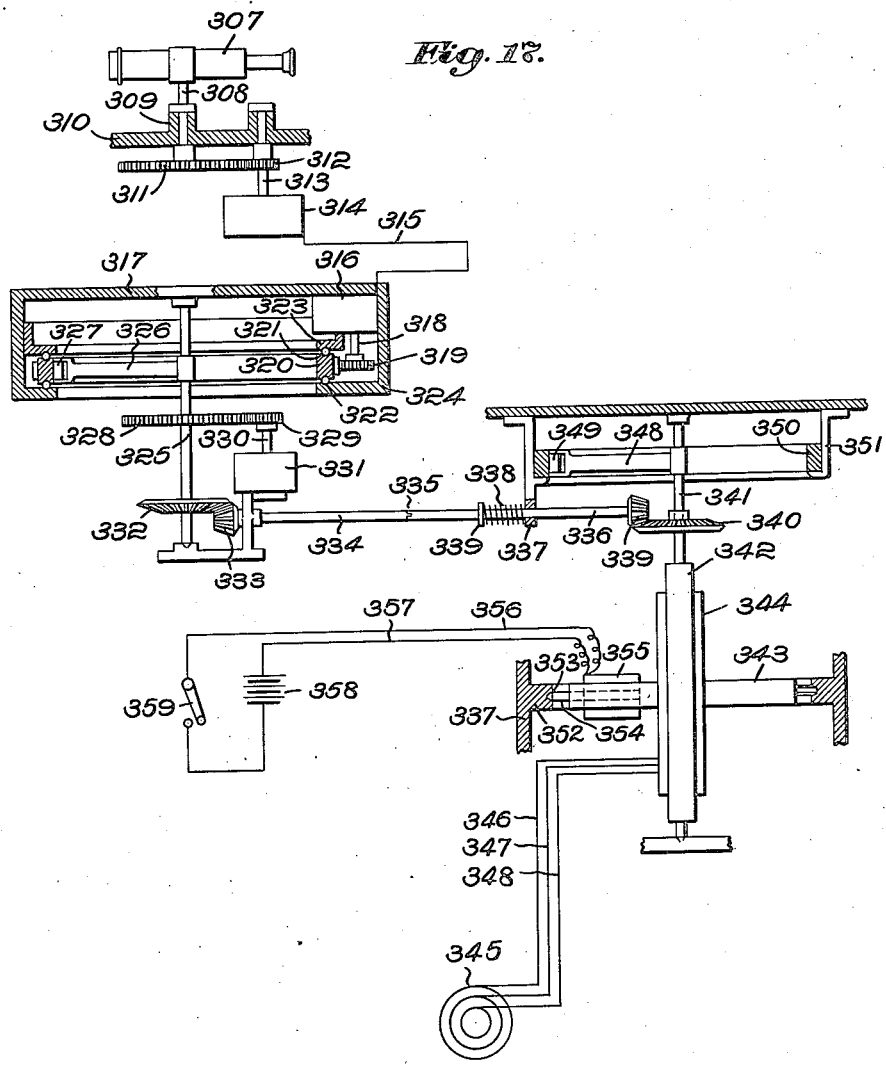

Fig. 17 is a similar view of still another form of my invention.

Fig. 18 is a plan view of one form of transmitter that may be employed in the practice of my invention;

Fig. 19 is a view mainly in cross section on the irregular line 19—19 of Fig. 18;

Fig. 20 is a plan view of a portion of a repeater that may be employed in the practice of my invention; and Fig. 21 is a view partially in plan and partially diagrammatic of certain portions of the repeater.

Prior to my invention disclosed in the application above referred to, the firing of torpedoes from fixed tubes in moving vessels has been a matter of very considerable difficulty, particularly in submarine work. Such tubes being an integral part of the hull of a submarine or other vessel, it has been necessary to train the longitudinal axis of the submarine in the direction of the target. In order to use the bow tubes, the submarine is forced to advance head-on to the target, and thus is frequently placed in a disadvantageous tactical position. Moreover, heretofore only certain tubes could be fired at a time, and this necessitated the carrying out of certain maneuvers by the submarine. In my system of torpedo fire control, the torpedoes may be fired from six or more tubes irrespective of the orientation of the longitudinal axis of the submarine, or other vessel carrying the same.

In accomplishing these and other results, I preferably employ a centralized method of control which, in the preferred embodiment thereof, is typified by a sighting apparatus or device which may be a periscope, telescope, a projector controlled mechanically, electrically or otherwise, or any other mechanism, preferably involving the use of the visual sense. In certain cases an indicating dial may be employed with relation to which the sighting apparatus or other control may be manipulated.

In the ensuing description, I shall refer to a vessel as carrying a torpedo or torpedoes. It is, however, to be understood that within the scope and purpose of my invention, I may employ any suitable basal support for the torpedo or torpedoes, and that therefore such terms of description are not limiting designations.

Figure 1:
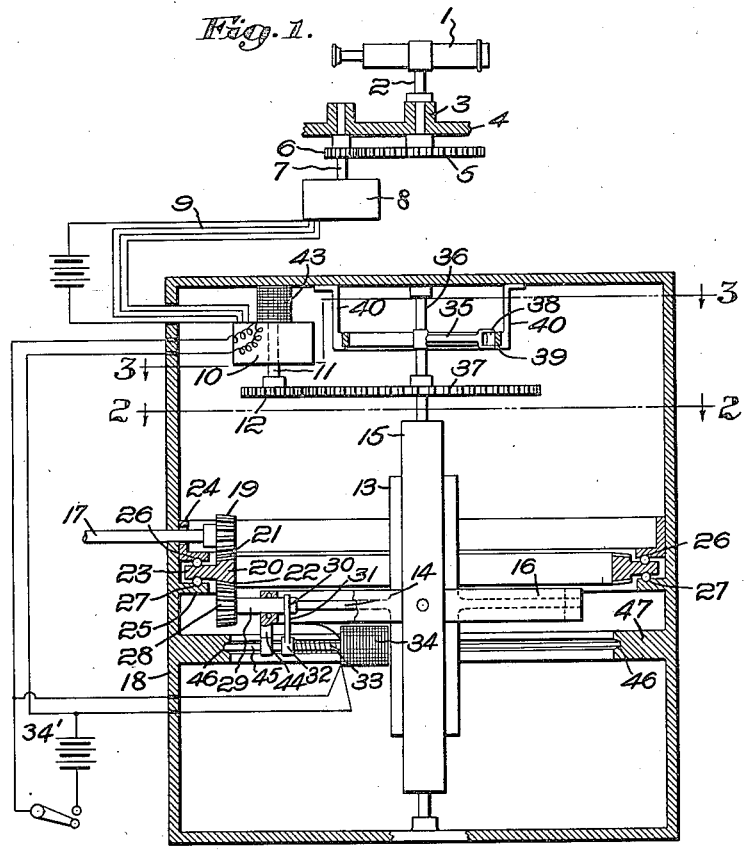
Fig. 1 is a view largely diagrammatic and partially in side elevation and partially in vertical section of one form of means for practicing my invention.
Figure 2:
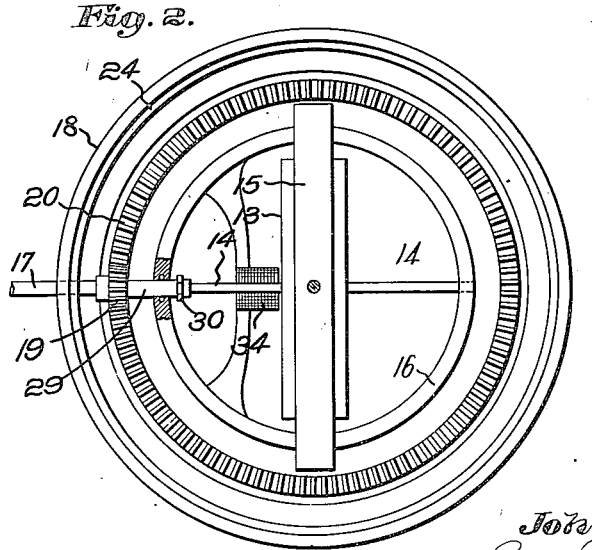
Fig. 2 is a transverse section upon the line 2—2 of Fig. 1.
Figure 3:
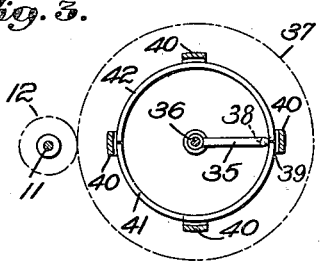
Fig. 3 is a section upon the line 3—3 of Fig. 1.

Referring first to the form of my invention shown in Figs. 1, 2 and 3, I have therein indicated at 1 a telescope constituting one form of sighting apparatus. In the disclosed embodiment of the invtntion, the apparatus is therefore represented as mounted upon a battleship or other non-submersible, but by substituting a periscope or in any other suitable manner the invention may be adapted and is intended to be applied to submarines.

The telescope 1 is represented as mounted for rotation in a horizontal plane upon a vertical shaft 2 mounted in a suitable bearing 3 upon the framing 4 of the vessel such as a battleship. The said shaft 2 has fast thereon a gear 5 meshing with a pinion 6 supported in the framing upon a shaft 7, the latter constituting a portion of a transmitter diagrammatically indicated at 8, and connected by suitable electrical conductors 9 with a repeater 10 having a shaft 11 provided with a pinion 12. The parts 1 to 8, inclusive, are mounted upon the ship and the conductors 9 enter the torpedo by means of a plug, whereby when the torpedo is discharged the conductors are automatically separated from the ship.

In the form of my invention shown in Figs. 1, 2 and 3, I provide a gyroscope, constituting the preferred form of direction-maintaining means for the torpedo. While any other suitable direction-maintaining means may be provided, I preferably employ a gyroscope. In said figures, the rotor or gyroscopic element of the gyroscope is indicated at 13 as positioned vertically and as adapted to rotate about a horizontal axis 14. The vertical gimbal ring of the gyroscope is indicated at 15 and the horizontal gimbal ring is indicated at 16. These parts may be of any approved construction. In this type of my invention, however, I employ a gyroscope, the rotor of which is normally not driven, but which is started when the torpedo is discharged. For this purpose, I provide a suitable turbine, not shown. I have indicated at 17 a shaft driven by the turbine, said shaft being started automatically when the torpedo is discharged in a manner not herein necessary to disclose. Preferably the driving of the rotor by the turbine is for but a brief interval of time, the rotor being continued in motion by momentum after the disconnection therefrom from the turbine driven shaft, as hereinafter set forth.

The gyroscope casing fixed within and constituting a part of the framing or hull of the torpedo is indicated at 18 in Fig. 1. The turbine driven shaft 17 extends therethrough and is provided upon its inner end with a pinion 19 adapted to mesh with an annular gear 20 having teeth upon its upper and lower faces 21, 22. The said annular gear is provided with a horizontal flange 23 between the upper and lower faces of which and annular brackets 24, 25 are provided annular rows of ball bearings 26, 27, whereby said annular gear 20 may rotate at the proper time. Meshing with the teeth 22 upon the lower face of the annular gear 20 is a pinion 28 fast upon a sleeve 29 having an internal, polygonally shaped socket adapted to receive a similarly shaped outer end of the rotor shaft 14, whereby said sleeve 29 with pinion 28 may be moved to bring said pinion into and out of mesh with the annular gear 20. To this end the said sleeve 29 is provided with an annular groove 30 receiving a yoke 31 upon an arm 32 mounted upon the core 33 of a solenoid 34.

In this form of my invention I provide a member upon the torpedo which is adapted to be moved synchronously with the telescope or other sighting means and thereby to be oriented therewith. Herein for the purpose I provide a contact arm indicated at 35, it being fast upon an upright shaft 36 of the gyroscope having bearings in the framing of the torpedo and also having fast thereon a gear 37 meshing with the gear 12 of the repeater 10. Through the action of the said repeater any movement of rotation of the telescope or other sighting apparatus, through any angle is accompanied by the same movement of the contact arm 35. The said arm 35 is provided with any suitable contact device 38 adapted to make contact with a ring 39 which, in this form of my invention, is fixed to the hull or framing of the torpedo, being herein shown as carried by brackets 40, 40. The said ring 39 constitutes one form of so-called azimuth ring and is provided with segments 41, 42, insulated from each other and generally similar in construction and function to those disclosed in my said co-pending application.

The said azimuth ring is connected to the steering gear, not herein shown, but which may be similar to that shown in my said co-pending application or to that shown in earlier applications filed by me. The construction and arrangement of parts are such that, dependent upon which segment of the azimuth ring the arm 35 makes contact, the steering gear is turned to starboard or port in a manner fully described in connection with Figs. 4 and 5.

I have heretofore stated that the rotor of the gyroscope is automatically started when the torpedo is discharged. An electric circuit, represented at 34', is so constructed and arranged as to be automatically closed when the gyroscope rotor gets up to speed.

By the automatic closing of said circuit a solenoid or other suitable instrumentality is thereby energized. Herein for the purpose I have represented the gimbal ring 16 as carrying the solenoid 34, which when energized, acts as previously stated, to move inward the core 33, thereby disconnecting the pinion 28 from the annular gear 20. There is a small amount of play allowed between the gear 28 and the annular ring 20 so that the gear will not bind when being withdrawn.

The framing of the torpedo is also provided with a solenoid 43, which is also connected to the said automatically closed circuit 34', whereby upon the discharge of the torpedo the shaft 11, constituting the core of said solenoid, is moved vertically, thereby withdrawing the pinion 12 from meshing relation with the gear 37.

Therefore, upon energization of the solenoids 34 and 43 the rotor of the gyroscope is left free in space and it continues to run through its own momentum for a sufficient length of time to steer the torpedo toward and cause it to strike the object to be hit.

In order to support the pinion 28 so that at the proper time it may mesh with the annular gear 20, I provide the gimbal ring 16 through which the sleeve 29 of the gear passes, with a depending bracket 44 through which the prolonged core 33 of the solenoid 34 can slide. The said prolonged core 33 has a free, somewhat pointed end 45 adapted to ride in an annular groove 46 in an annular bracket 47 upon the framing 18, whereby whatever be the position of the rotor of the gyroscope, the said pinion 28 is so supported that it may mesh with the annular gear 20.

From the foregoing description of this form of my invention, it will be evident that when the rotor of the gyroscope is driven as described, it will be oriented by the repeater mechanism and the axis or shaft 14 of the gyroscope rotor will be maintained in line or parallel with the longitudinal axis of the telescope 1, such orientation occurring before the rotor is driven through the turbine driven shaft 17. In so doing the pinion 28 remains in mesh with the annular gear 20, thus maintaining a driving relation with the turbine driven shaft 17 and its pinion 19. The annular gear 20 being carried by the casing 18 remains stationary until the torpedo is started, but the driving relation with the pinions 19 and 28 is maintained until the pinion 28 is withdrawn from meshing relation through the described energization of the solenoid 34.

The orientation of the telescope or other sighting instrumentality 1 is as described accompanied by the synchronous movement of the arm 35, and, through its contacts with the segments upon the azimuth ring 39, the steering mechanism of the torpedo is controlled.

In that form of my invention shown in Figs. 1, 2 and 3, I employ a contact arm or member which is synchronized in movement with the sighting apparatus and which turns about an azimuth ring fixed to the hull of the torpedo. In that form of my invention shown in Figs. 4 and 5, I have represented the reverse construction, namely, one wherein the arm or member is, or at the proper time becomes, fixed in relation with the gyroscope, and the azimuth ring, is turned or oriented with respect to the sighting apparatus, it being, however, turned in the opposite direction to the telescope and at the same angular speed. Furthermore, in the construction shown in Figs. 1, 2 and 3, I have represented a mechanically spun gyroscope, the rotor of which is driven but momentarily or for a brief period. In that form of the invention shown in Figs. 4 and 5, I have represented a construction wherein the rotor of the gyroscope is constantly driven until it is discharged, after which it continues to rotate by its own momentum.

Referring more particularly to said Figures 4 and 5, I have therein represented the telescope or other sighting means 48 mounted upon a shaft 49, supported in the framing 50 and having fast thereon a gear 51 meshing with a pinion 52 upon the shaft 53 of the transmitter 54 from which, as in Figs. 1, 2 and 3, extend suitable electrical conductors 55 to the repeater 56 which is supported in the framing 57 of the torpedo. The parts 48 to 54 are mounted upon the vessel or other basal support and the conductors 55 which extend into the torpedo pass through a plug, not shown, whereby when the torpedo is discharged, the conductors are separated.

The casing of the gyroscopic element is indicated at 58, it containing two rotors mounted one about the other in the same plane and rotating in opposite directions, and which are continuously driven through a conductor 59 from a three phased generator 60 or any other suitable source of energy located in the ship and connected by a plug to the torpedo. The said gyroscopic element is herein represented as provided with a horizontal gimbal ring 61 and a vertical gimbal ring 62, the latter having a lower support 63 and a shaft 64 extending through the casing 57 of the torpedo. The said gyroscopic element is so constructed that it remains in the azimuth in which it is started.

In this form of the invention, I provide a contact arm 65, which is fixedly mounted upon a solenoid 66, itself supported by a rod 67, suitably suspended at 68 from the under surface of the casing 57. Upon said under surface of the casing 57 is a stationary clutch member or disk 69 with which is adapted to engage a second clutch member or disk 70 and normally supported in clutching relation with the disk 69 by a coiled spring 71. The clutch disk 70 is provided with two depending rods 72 constituting cores of the solenoid 66 and which enter passages therein. Below the solenoid 66 is provided a sliding clutch disk 73 mounted for axial but non-rotating movement upon the shaft 64 of the gyroscope, whereby the said clutch disk 73 may be clutched to the lower face of the solenoid 66, thus to clutch the shaft of the gyroscope to the solenoid 66, which as previously stated, is suspended from or attached to the framing of the torpedo.

The solenoid 66 is in circuit with conductors 74 and I have provided a switch 75 adapted to be automatically closed when the torpedo is discharged from the vessel. Upon the closing of said circuit the solenoid 66 is energized and the clutch disk 70 is disengaged from the clutch disk 69 fast upon the hull, thus releasing the arm 65 from the hull. The said arm is normally held parallel with the axis of the torpedo. At the same time, however, the clutch disk 73 is clutched to the solenoid 66 and thereby the latter, together with the said arm 65 becomes clutched to the shaft 64 of the gyroscope. Thus, the arm 65 maintains a fixed relation with respect to the rotor of the gyroscope immediately upon the discharge of the torpedo and throughout the steering of the latter.

In this type of my invention, I provide an azimuth ring 76, the upper and lower faces whereof are grooved and provided with ball bearings 77, 78, adapted to run in tracks in the brackets 79, 80. The repeater 56 is provided with a shaft 81 having fast thereon a pinion 82 adapted to mesh with teeth 83 upon the azimuth ring 76, whereby the said ring is turned synchronously with the telescope or other sighting apparatus 48, but in an opposite direction thereto and to an equal extent.

The azimuth ring 76 is provided with segments 86, 87, which may be generally similar in construction with those shown or indicated in Figs. 1, 2 and 3, and in my said earlier filed application, whereby upon orientation of said azimuth ring 76, the contact 88 upon the arm 65 so cooperates with said segments as to control the steering apparatus.

I have referred to the circuit 74 as being automatically closed, thereby to effect the energization of the solenoid 66. If desired, I may so change the construction of parts that the solenoids may be de-energized upon the breaking of the circuit, the parts being otherwise reversed so as to obtain the same result, and this may also be done in that form of my invention shown in Figs. 1, 2 and 3.

In Fig. 5 I have diagrammatically indicated the steering apparatus wherein I have represented a cylinder or valve casing 88 having therein a piston valve 89 controlling the motive fluid supply pipes 90, 91 connected with opposite ends of a cylinder 92 having therein a piston 93 connected with the piston rod 94 pivotally connected at 95 with the rudder 96. The motive fluid, which is preferably compressed air, is introduced through the passage 97 into the cylinder 88. The compressed air, controlled by the valve, passes through the pipe 90 or 91 as the case may be, thereby moving the piston 93, and the air is exhausted from the opposite side of the piston through the proper exhaust 98 or 99. The foregoing construction may be similar to that disclosed in the earlier application filed by me and need not be more fully herein described.

The piston valve 89 constitutes the core of two solenoids 100, 101, the former being connected by conductor 102 to the segment 86 and the latter being connected by conductor 103 to the segment 87, said solenoids being both connected by conductors 104, 105, 106 with battery 107 to the arm 65.

Figure 6:
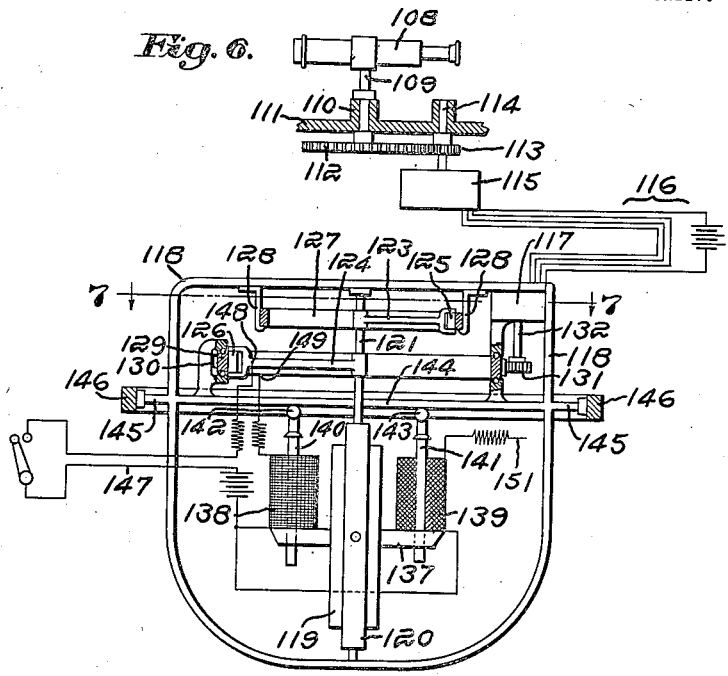
Fig. 6 is a view similar to Fig. 1 of still another form of my invention.
Figure 7:
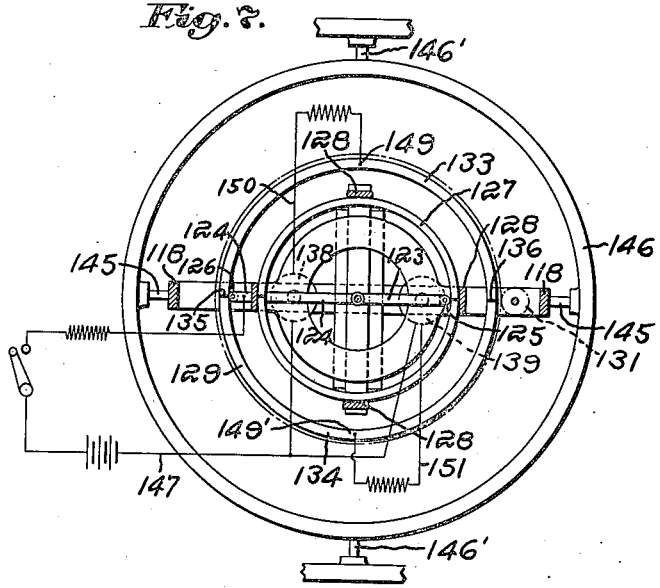
Fig. 7 is a cross sectional view upon the line 7—7 of Fig. 6.

In Figs. 6 and 7, I have represented still another form of my invention, wherein I provide a gyroscope, the rotor whereof is kept constantly running as in that form of the invention shown in Figs. 4 and 5, but follows the telescope or other sighting instrumentality in azimuth, as in that form of the invention shown in Figs. 1, 2 and 3. In certain aspects thereof, that form of the invention shown in Figs. 6 and 7, includes features embodied respectively in that form of the invention shown in Figs. 1, 2 and 3 and that form of the invention shown in Figs. 4 and 5. In the form of the invention shown in Figs. 6 and 7, I provide a contact arm or member which I preferably maintain fixed with relation to the gyroscope and an azimuth ring which is turned about or with relation to said arm or member, being maintained in fixed relation with the telescope or other sighting means.

In said Figs. 6 and 7, I have indicated the telescope or other sighting instrumentality at 108, as supported upon an upright shaft 109 mounted at 110 in the framing 111 of the vessel or other basal support. The said shaft 109 is provided with a gear 112 adapted to mesh with a pinion 113 upon a shaft 114 mounted in the framing and connected with the transmitter, diagrammatically indicated at 115. From the latter extend conductors 116 suitably connected with the repeater diagrammatically indicated at 117, and which is mounted in a casing 118 supported in the gimbal ring 146 which is pivoted at 146' to the hull of the torpedo. The said conductors 116 extend through a plug, not shown, whereby upon the firing of the torpedo, the conductors may be suitably severed.

The casing of the gyroscope rotor which is run in a vacuum, is indicated at 119 and one of the gimbal rings of the gyroscope is indicated at 120. Preferably the said rotor is kept constantly running and desirably in the manner indicated in connection with the form of the invention shown in Figs. 4 and 5. The gyroscope is provided with an upright shaft 121, pivotally mounted in the framing 118.

Upon the shaft 121 are fixed two arms 123 and 124 having respectively contact members 125, 126. The arm 123 is adapted to make contact with the segments upon an azimuth ring 127 supported in brackets 128 and insulated therefrom. The said azimuth ring and its segments are constructed preferably similarly to the azimuth rings already described and is connected in a manner not herein necessary more fully to describe, but preferably similar to that shown in Fig. 5, with the steering apparatus of the torpedo, whereby said steering apparatus is controlled during the flight of the torpedo. Said ring 127 functions therefore only after the firing of the torpedo. In cooperation with the contact arm or member 124 I provide a second azimuth ring 129 having thereon teeth 130 whereby said ring is rotated synchronously with the telescope 108 through the agency of a pinion 131 fast upon the shaft 132 of the repeater 117. The said azimuth ring 129 is provided with segments 133, 134, preferably similar in construction with those heretofore described. The contact points 135, 136 thereof are thereby maintained in line with the axis of the telescope 108.

From the casing of the gyroscope extend two supports 137 having mounted thereto two solenoids 138, 139, provided respectively with cores 140, 141 adapted to be elevated when the solenoids are respectively energized. The upper ends of said cores are preferably provided with roller bearings 142, 143, one of which, when its solenoid is energized, is lifted into engagement with a plate 144 which is part of the frame 118, the whole frame 118 being pivoted at 145, 145 to the gimbal ring 146.

I provide a suitable circuit 147 which is adapted to cause one or the other of said solenoids 138, 139 to be energized, dependent upon the position of the arm 124 with relation to the segments of the azimuth ring 129, it being noted that the circuit 147 is operatively connected at 148 to the arm 124, and at 149, 149' to the segments 133, 134, respectively, of the azimuth ring 129. Viewing Fig. 7 it will be evident that the segment 133 is connected by conductor 150 to the solenoid 138 and that the segment 134 is connected by conductor 151 to the solenoid 139, whereby one solenoid or the other may be energized depending upon the position of the arm 124 relative to the azimuth ring 129.

The circuit 147 will be automatically opened as the torpedo is discharged.

Contacts of either solenoid core 140, 141 with the plate 144 destroys the equilibrium existing when both said cores are out of contact with said plate, and therefore causes a precessing of the gyroscope in the direction of the orientation of the telescope 108.

If desired, I may employ a construction wherein both solenoid cores are normally in contact with the plate 144, and upon energization of one of the solenoids, its core is withdrawn from such contact, thereby destroying the equilibrium and causing precessing of the gyroscope.

In Figs. 8, 9 and 10, I have represented still another form of my invention and one wherein the axis of the gyroscope is always maintained in fixed relation to the axis of the torpedo and preferably in parallelism thereto and is kept constantly spinning by an external source of three phase current. Preferably the gyroscope is held rigid with the hull of the torpedo prior to the discharge of the latter and is freed in space when the torpedo is fired.

In said form of my invention, I have represented the telescope or other sighting means at 152, it being mounted upon the shaft 153, itself mounted upon the vessel and having fast thereon a gear 154 meshing with a pinion 155 upon a shaft 156 of the transmitter 157 connected by electrical conductors 158 with the repeater 159 suitably supported upon the hull of the torpedo. The parts 152 to 157 are mounted upon the ship, submarine or other basal support, and the conductors 158 extend to and into the torpedo, passing through a suitable plug, not shown, whereby upon the discharge of a torpedo the conductors may be severed. The shaft 160 of the repeater is provided with a pinion 161 meshing with the gear teeth 162 upon an azimuth ring 163 supported by ball bearings 164, 165 between the brackets 166, 167. The said azimuth ring is therefore oriented synchronously with the telescope or other sighting means 152, the said ring being, as in the form of my invention shown in Figs. 4 and 5, rotated in the opposite direction from the telescope 162, but to an equal extent. The said azimuth ring 163 is provided with segments similar to those shown in the other forms of the invention and adapted respectively to be connected to the steering mechanism whereby upon the discharge of the torpedo the rudder thereof may be turned in such direction as to cause the torpedo to strike the object that is attacked.

The rotor of the gyroscope is indicated at 167 and rotating within a casing 167', the latter being rigidly connected to or suitably supported by the gimbal ring 168. Said gimbal ring 168 is supported in the vertical gimbal ring 169 by the pivots 170 and 171. The gimbal ring 169 is pivotally supported at 172 and 172'. Fast upon the pivotal support 172 of the gyroscope is a contact arm or member 173 provided with a suitable contact 174 adapted to engage and make contact with either segment of the azimuth ring 163.

Normally the gyroscope is held rigid with the hull of the torpedo. For that purpose I have herein represented a solenoid 175 fixed upon the hull 176 of the torpedo and having connected therewith a suitable circuit 177 provided with a switch 178 adapted to be automatically closed at a suitable time, such as, for example, upon the firing of the torpedo. The solenoid is provided with one or more and preferably with three cores 179, 180, 181, which are normally held by springs 182, 183, 184 in engagement with sockets formed in the portion 185 of the gimbal ring 168, whereby prior to the discharge of the torpedo the gyroscope is held fixed with the hull.

In this form of my invention, the gyroscope is driven from an outside source of power, and preferably from a three phase generator 186 upon the hull of the ship, submarine or other basal support. From said generator lead the conductors 187, 188, 189 to the three pins or cores 179, 180, and 181 of the solenoid 175, (said pins being insulated from each other but adapted to plug into suitable sockets) whereby so long as the said pins or cores are maintained in the position shown in Figs. 9 and 10, current is supplied to the rotor of the gyroscope through said conductors 187, 188, 189, leading to the stator winding, mounted in the casing of the gyroscope.

The conductors 187, 188 and 189 extend therefore into the hull of the torpedo and at some suitable point through a plug, not shown, whereby the conductors may be severed when the torpedo is fired.

When the cores 179, 180 and 181 are withdrawn from engagement with the gimbal ring 168 of the gyroscope, the latter is free in space. By employing said cores instead of a commutator, the friction incident to the brushes of a commutator after the current has been cut off, is avoided. The construction shown in Figs. 8, 9, and 10 is made strong enough to resist all strains. The arm or member 173 is as stated held in fixed relation with the rotor of the gyroscope and in fixed relation with the torpedo axis. Thus, the said arm and the gyroscope are both held fixed with relation to the axis of the torpedo until the latter is discharged.

In Figs. 11 and 12 I have diagrammatically indicated the course of the torpedo upon and after the discharge from the ship or other basal support. In Fig. 11, I have diagrammatically indicated the functioning of the parts and the course of the torpeedo in that form of the invention shown in Figs. 1 2 and 3, in Figs. 6 and 7, and also in Figs. 16 and 17. In said forms of the invention, the azimuth or contact ring is stationary and the arm or member is oriented with relation thereto.

In Fig. 11, the axis of the gyroscopic element or rotor is indicated at 190, the rotor being indicated at 191 and the azimuth ring at 192. At the location A I have diagrammatically indicated the torpedo as its parts may be located before the sighting apparatus is trained upon the vessel to be attacked. At the location B I have indicated the position of the parts when the sighting apparatus has been trained upon the vessel to be attacked and which is herein indicated at 193, the topedo being instantly discharged. It will be noted that the gyroscopic element 190 is pointed toward the hostile vessel 193. Hence the path 194 indicates the line of sight from the vessel or submarine from which the torpedo is being discharged to the hostile object 193. The torpedo as discharged takes the course 195 as set forth in my said copending application, which veers into parallelism with the line of sight 194 so that the hostile vessel will be struck at 196. At the location C I have indicated the torpedo as having its azimuth ring 192, which is fixed to the hull, so as to turn with the hull in such manner that the contact points thereon are brought into alignment with the contact point upon the gryoscopic element 190, thus insuring the further travel of the torpedo in parallelism with the line of sight 194. It will be observed that in the intermediate location B representing the condition of the parts when the torpedo is fired, the azimuth ring 192, and consequently the hull of the torpedo, have not yet been brought into such line with the gyroscopic element as to compel the parallelism of course with the line of sight 194 that occurs after the location C is reached.

In Fig. 12, I have diagrammatically indicated the functioning and positioning of the parts in that form of my invention shown in Figs. 4, 5, 8, 9, 10 and 15. In said forms of the invention the gyroscopic element or contact arm always remains fixed and the azimuth ring is turned in an opposite direction from the orientation of the telescope or other sighting means and to an equal extent. In such form of the invention, the said azimuth ring is oriented before the torpedo starts upon its journey and then becomes fixed to the hull of the torpedo, as hereinbefore set forth in detail.

In said Figure 12, I have indicated at the location A' the torpedo as its parts are positioned prior to the orientation of the telescope or other sighting apparatus with respect to the hostile vessel 197. Therein the contact arm is indicated at 198, the rotor being indicated at 199. The azimuth ring is indicated at 200. At the location B' is indicated the condition of the parts of the torpedo as the telescope or other sighting means is trained upon the hostile vessel 197. In the location A' the contact point 201 of the azimuth ring is shown as in alignment with the contact arm 198. When, however, the telescope has been oriented upon the hostile vessel, the azimuth ring 200 is oriented in the opposite direction, as previously stated, whereby the contact point 201 is moved in an opposite direction, the angle $a$ formed by the telescope and the axis of the torpedo equalling the angle $b$ formed by said axis of the torpedo and the contact 201 of the azimuth ring 200. At the location C', the azimuth ring 200 which becomes fixed to the hull of the torpedo upon and after the discharge thereof, has been turned with the hull by the steering means, so that the contact 201 has been brought into alignment with the contact arm 198. Therefore, the course 202 of the discharged torpedo is thereupon brought into parallelism with the line of sight 203 from the telescope to the hostile vessel 197, and the latter is therefore struck at the point 204.

In those forms of my invention wherein the azimuth ring is moved, when the torpedo is discharged and the plug of the conductor is pulled out, thus breaking the repeater circuit, the azimuth ring remains fixed with respect to the torpedo by the friction of the gearing and the repeater.

It will, of course, be understood that where the object to be attacked is moving, methods, such for example as those now employed in connection with the firing of a single torpedo must be employed to correct for the course and speed of the enemy, the tidal conditions and other factors which it is not herein necessary to refer to in detail. Therefore, the line of travel of the torpedo will not be in exact parallelism with the lines of sight 194 and 203 indicated in Figs. 11 and 12, but will be at an angle thereto controlled by the factors above referred to. For example, the angle imposed or created by the said factors may be ascertained and added to or subtracted from the line of travel of the torpedo, thus giving the actual line of travel thereof.

Figure 13:
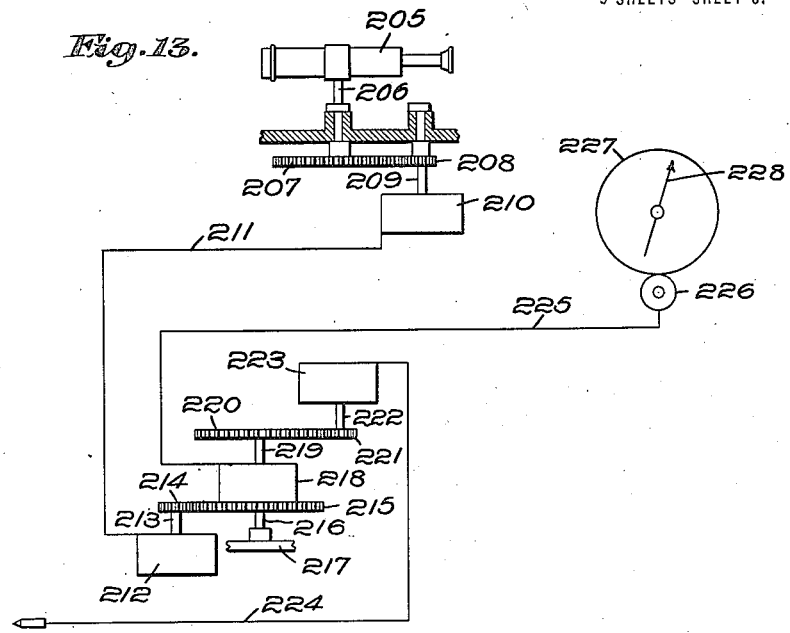
Fig. 13 represents mainly diagrammatically, one form of means whereby a determined amount of angular divergence may be imparted to the torpedoes.

In Fig. 13, I have indicated mainly diagrammatically one form of means whereby any desired amount of angular displacement may be imposed upon a plurality of torpedoes discharged from a ship or other basal support. Therein I have indicated a sighting instrumentality at 205, which may be a telescope, periscope or other suitable instrumentality. Said instrumentality is mounted upon a shaft 206, itself mounted in the framing of the vessel and having fast thereon a gear 207 meshing with a pinion 208 fast upon the shaft 209 of a transmitter 210 having an electrical conductor 211 extending therefrom to a suitable repeater 212. Fast upon the shaft 213 is a pinion 214 meshing with a gear 215 having a shaft 216 mounted in the framing at 217. Mounted upon the gear 215 is a repeater 218 having a shaft 219 carrying a pinion 220 meshing with a pinion 221 fast upon a shaft 222 of a transmitter 223, leading from which are suitable conductors 224 which extend through the hull of the torpedo where they are suitably plugged to permit automatic severance upon the firing of the torpedo. Said conductors lead to the gyroscope or other direction-maintaining means of the torpedo and control the movement thereof in the manner heretofore described, so that when the torpedo is fired, its path of travel is modified. The conductor 224 may lead to a plurality of torpedoes, thus controlling the paths of travel of said torpedoes.

The repeater 218 has extending thereinto electrical conductors 225 extending from a transmitter 226 controlled by a dial 227 having an indicator 228.

The construction and mode of operation are such that the turning of the telescope or other sighting instrumentality 205 effects the sychronizing movement of the gear 215. The latter, however, carries a repeater 218 upon which a movement of angular displacement is imparted through the dial 227. Therefore the ultimate movement imparted to the shaft 219 is not precisely sychronized with the movement of the sighting instrumentality 205, but is modified by the desired extent of angular deflection which in the described manner is imposed thereupon. Thus the ultimate movement imparted to the torpedo or torpedoes through their gyroscopes is such as to give the desired angular deflection to the paths of travel thereof.

The position of the indicator 228 is determined from and is dependent upon the various factors controlling the position of the hostile vessel at any given moment with respect to the ship having my invention thereon. These factors are in practice figured out in the plotting room and their result is transmitted to the person in charge of the dial 227, who thereupon sets the said indicator 228.

In Fig. 14, I have represented mainly diagrammatically one form of means whereby the modification imposed upon the gyroscope or other direction-maintaining means of a torpedo may be retained thereby for any desired interval prior to the firing of the torpedo. This form of my invention may be employed upon any suitable basal support, such, for example, as a ship, either submersible or non-submersible. It is, however, particularly adapted for use upon a submarine, whereby, after the periscope has been trained upon the hostile vessel, the submarine may be submerged, and after any desired or necessary interval, during which the movement imposed upon the torpedo-controlling means through the training of the periscope is maintained, the torpedo is fired.

In said Fig. 14, I have indicated a sighting instrumentality at 229. This may be of any suitable character. While I have herein shown a telescope, it will be understood that in the case of a submarine a periscope may be employed. The said sighting instrumentality is mounted upon a shaft 230 having suitable bearings on the framing 231 and having fast thereon a gear 232 meshing with a pinion 233 fast upon a shaft 234 of a transmitter 235. Leading from said transmitter are suitable conductors 236 extending to a suitable contact 237.

At 238 I have diagrammatically indicated one form of gyroscopic compass whereby a true north and south line may always be maintained. A gear 239 of said gyroscopic compass meshes with a pinion 240 mounted upon a shaft 241 of a transmitter 242, leading from which are suitable conductors 243 extending to some suitable contact 244 adjacent to the contact 237.

Suitably positioned with respect to the contacts 237 and 244, is a double-throw, four-pole switch 245, herein represented as pivoted at 246, and leading therefrom are conductors 247 suitably plugged to permit automatic severance thereof and extending through the hull of the torpedo and to a repeater 248 therein, the same being operatively associated with the direction-maintaining means in any suitable manner, as, for example, through suitable gearing with the rotor 250. The azimuth ring of the gyroscope of the torpedo is indicated at 249 and the contact arm of the rotor at 251.

In the use of that form of my invention shown in Fig. 14, the sighting instrumentality 239 is trained upon the hostile vessel, at which time the switch 245 is in engagement with the contact 237. Therefore the repeater 248 imparts a movement to the contact arm 251 in synchronism with the training movement of the sighting instrumentality 229. Thereupon the switch 245 is moved from engagement with the contact 237 into engagement with the contact 244, thus bringing the gyroscopic compass 238 into circuit with the repeater 248, whereby said gyroscopic compass acts through the transmitter 242 and the repeater 248 to maintain in space the position imposed upon the contact arm 251 or other functioning parts of the direction-maintaining means of the torpedo.

In this manner, the position imposed upon said contact arm 251 through the training of the sighting instrumentality 229 may be maintained for any desired length of time. For example, if the invention be employed on a submarine the periscope may be trained upon the hostile vessel and through the transmitter 235, the switch 245 being in engagement with the contact 237, the repeater 248 will move a co-acting part of the gyroscope upon the torpedo in synchronism with the orientation of the periscope. Thereupon the submarine may be submerged, the switch 245 being moved into engagement with the contact 244, thus bringing the gyroscopic compass 238 into circuit with the repeater 248. The said gyroscopic compass acts to maintain the said synchronized position of the repeater 248 and hence of the co-acting portion of the gyroscope, for any desired length of time.

In Fig. 15, I have represented still another form of my invention, and wherein the rotor of the gyroscope is adapted to be driven merely momentarily and to be disconnected upon the firing of the torpedo after which the rotor is left to run by its own momentum. In this form of my invention, moreover, the gyroscope itself is held fixed with relation to the hull of the vessel until the firing of the torpedo.

In said Fig. 15, the sighting instrumentality is indicated at 252. This may be of any suitable character and is here shown as a telescope. If the invention be used upon a submarine the telescope would be replaced by a periscope. The said telescope is mounted upon a shaft 253 itself mounted in a suitable bearing 254 in the framing of the vessel. Fast upon said shaft is a gear 255 meshing with a pinion 256 fast upon the shaft 257 of a transmitter 258 which is connected by suitable electrical conductors 259 with a repeater 260 within the torpedo. The conductors 259 pass through the hull of the torpedo and are there suitably plugged to permit the automatic severance of said conductors upon the firing of the torpedo. Upon the shaft 261 of the repeater is a pinion 262 meshing with suitable teeth 263 upon an azimuth ring 264 provided with ball bearings 265, 266, provided in brackets 267, 268, suitable insulation being provided for said ring. The construction and relation of parts are such that upon orientation of the sighting instrumentality 252, the azimuth ring 264 is moved in an opposite direction and to an equal amount.

The rotor of the gyroscope is indicated at 269, the vertical gimbal ring at 270 and its supporting shafts or spindles at 271, 272, and the horizontal gimbal ring is indicated at 273. Fast upon the upper shaft or spindle 272 of the gyroscope is a contact arm 274, said contact arm and azimuth ring co-acting in the control of the steering gear in the manner set forth in other forms of my invention.

While the rotor of the gyroscope may be driven in any suitable manner, I contemplate in this form of my invention driving the same momentarily through a suitable turbine or otherwise driven shaft indicated at 275. The said shaft is so mounted as to be moved axially without disturbing its rotation. Fast upon said shaft is a pinion 276 meshing with and driving a pinion 277 upon the axle 278 of the rotor whereby the said rotor may be driven by the turbine so long as said pinions 276 and 277 remain in mesh. In this form of my invention the gyroscope, until the torpedo is discharged, is held fixed with relation to the hull and therefore the rotor of the gyroscope may be driven by said pinions 276, 277. In order to maintain the gyroscope fixed with relation to the hull, I have herein represented the gimbal ring 273 as having a bracket or projection 278′ having therein a suitable socket 279 adapted to receive the pointed or rounded end of a rod or arm 280. The rod 280 carries a projection 280′ the upper end of which carries a yoke which engages with a sleeve on the shaft 275.

In order to impart axial movement to the shaft 275 when the torpedo is fired, I may employ any suitable means but preferably I provide a solenoid 281, the core 282 whereof forms a continuation of the rod or arm 280 or is suitably connected thereto. The spring 283 is provided acting normally to maintain the core 282 in the position shown. The solenoid 281 is in circuit with conductors 284 and 285 and battery 286, a switch 287 being provided which is adapted to be automatically closed upon the firing of the torpedo, and thereby energizing the solenoiod 281 and imparting axial movement to the shaft 275. In this manner the pinion 276 is withdrawn from mesh with the pinion 277 and the rod 280 is withdrawn from the bracket 278′. Thus the gyroscope is disconnected from the hull and is left free in space so that its rotor may continue to run by momentum, upon the firing of the torpedo.

In Fig. 16, I have shown still another form of my invention. In this form of my invention the gyroscope is held fixed with relation to the hull of a torpedo up to the time of the discharge of the latter and the gyroscope is driven momentarily through a turbine or otherwise driven shaft. In these respects this form of my invention may be and preferably is the same as that shown in Fig. 15, the parts being herein similarly numbered.

Instead, however, of providing a contact arm fast upon a shaft or spindle of the gyroscope, I provide a contact arm normally free from the gyroscope and adapted to be clutched or otherwise connected thereto as the torpedo is discharged. Preferably also and as herein shown, the azimuth ring is stationary and the contact arm is oriented in synchronism with the sighting instrumentality which may be of the character indicated with reference to Fig. 15.

In said figure, I provide conductors 288 leading from the transmitter 258 and operatively associated with the repeater 289 having a shaft 290 provided with a pinion 291 fast thereon. In mesh with and driven by said pinion is a gear 292 which, therefore, moves in synchronism with the sighting instrumentality. Fast upon the shaft 293 of said gear 292 is a solenoid 294 in circuit with conductors 295, 296 and battery 297, the said circuit being adapted to be closed by a switch 298 that is automatically moved for this purpose upon the discharge of the torpedo in a manner referred to in connection with other forms of my invention.

The solenoid 294 carries a contact arm 299 which may be similar in construction to those shown in other forms of my invention and co-acting in the manner previously described with an azimuth rin 300 herein shown as stationary and mounted in brackets 301 from which it is suitably insulated. The said contact arm and azimuth ring co-act to control the steering apparatus of a torpedo in a manner already described with reference to other forms of my invention.

The shaft or spindle 302 of the vertical gimbal ring of the gyroscope has splined thereon a clutch disk 303 capable of longitudinal sliding movement upon the said shaft 302, whereby upon energization of the solenoid 294 the said clutch disk is drawn into clutching engagement with the solenoid, suitably constructed for this purpose, whereby said shaft 302 is clutched to the solenoid hence the contact arm 299 becomes fixed with relation to the gyroscope.

In order to permit the gyroscope to move free in space upon the discharge of the torpedo, I provide any suitable means for disconnecting the pinion 291 from the gear 292. For that purpose I have herein represented the repeater 289 as carrying a solenoid 304 in circuit with conductors 305, 306 with the battery 297 and switch 298 whereby the solenoids 304 and 294 are simultaneously energized and act to disconnect said pinion 291 from the gear 292 and to render the contact arm 299 fixed with relation to the gyroscope which, thereupon, continues to run under its own momentum and free in space.

In Fig. 17, I have represented still another form of my invention and one wherein the gyroscope is continuously driven until the torpedo is discharged. In this form of my invention I have represented a fixed azimuth ring and a movable contact arm, but this construction may be reversed if desired. I employ suitable means acting preferably through mechanical connections bodily to move the gyroscope in synchronism with the orientation of the sighting means. I therefore preferably provide means to prevent precessing of the gyroscope prior to the discharge of the torpedo. Inasmuch as in this form of my invention considerable strains are set up, I may and preferably do employ an independently driven motor of any suitable construction, whereby the movement of certain parts is conveyed or transmitted to the gyroscope and parts associated therewith.

In said form of my invention I have indicated the sighting instrumentality at 307, it being a telescope, periscope or other suitable device, the character of which has been already set forth. I have herein represented a telescope mounted upon a shaft 308 in a suitable bearing 309 in the framing 310 of the vessel. Fast upon said shaft is a gear 311 in mesh with and driving a pinion 312 upon a shaft 313 of a transmitter 314 having leading therefrom conductors diagrammatically indicated at 315 and leading to a suitable repeater 316 also mounted upon the framing 317. Upon the shaft 318 of said repeater is a pinion 319 meshing with teeth upon an azimuth ring 320 having ball bearings 321, 322 received in brackets 323, 324, suitably insulated from said azimuth ring which in this form of my invention is turned in synchronism with the orientation of the sighting instrumentality.

Mounted in suitable bearings in the framing is a vertical shaft 325 having fast thereon or rigid therewith a contact arm 326 having a suitable contact 327 co-acting with the azimuth ring 320. Also fast upon the shaft 325 is a gear 328 meshing with a pinion 329 upon the shaft 330 of a motor 331. While the motor may be of any suitable construction, it is preferably one in which the armature and field windings thereof are separate so that the direction of rotation may be easily be changed. The said motor 331 is connected by suitable wiring to the contact arm 326 and the azimuth ring 320, and the purpose thereof is to cause the said contact arm to follow the azimuth ring in the orientation of the latter in synchronism with that of the telescope 307. When the azimuth ring 320 moves out of alignment with the contact arm 226, the said arm makes contact with one of the segments of the azimuth ring 320, thereby to energize a suitable circuit which causes the motor 331 so to operate that the contact arm 226 is caused to move into alignment with the azimuth ring 320. If the azimuth ring 320 moves in the other direction, the rotation of the motor 331 is reversed. By the described construction the motor is caused to drive the gear 328 and therefore the shaft 325 and parts driven by the latter whereby the strain of such movement is removed from the transmitter 314 and the repeater 316.

The shaft 325 has fast thereon a beveled gear 332 which, therefore, is turned in synchronism with the gear 311 and with the sighting instrumentality 307. Meshing with the gear 332 is a beveled pinion 333 upon a shaft 334 having therein a suitable clutch 335 and extending through the hull of the torpedo, the construction being such that upon the discharge of the torpedo the shaft 334 becomes automatically unclutched. The parts thus far described are upon the ship or other basal support for the torpedo.

The shaft section 336 extends through the hull of the torpedo and is provided with a suitable coiled spring 338 held under compression by a suitable collar 339 against the framing at 337, whereby upon the discharge of the torpedo and the unclutching of the shaft 334, axial movement to the left viewing Fig. 17 is imparted to the shaft section 336. Upon said shaft section is a beveled pinion 339 in mesh with the beveled gear 340 fast upon the shaft 341 of the gyroscope, the vertical gimbal ring whereof is indicated at 342, the horizontal gimbal ring at 343 and the rotor casing at 344. The gear 340 is therefore turned in synchronism with the gear 332 and gear 311, and therefore with the sighting instrumentality 307.

The rotor of the gyroscope is preferably constantly driven until the discharge of the torpedo and for this purpose I have herein represented a three phase generator 345 leading wherefrom are three conductors 346, 347, 348. The said generator is mounted upon the ship carrying the torpedo and therefore the conductors extend through a suitable plug not herein shown, and thence to the gyroscope as in other forms of my invention, being desirably connected to the stator winding thereof through suitable commutators, slip rings, or the like, not shown. Fast upon the shaft or spindle 341 of the gyroscope is a contact arm 348' similar in construction to those previously described and having a contact 349 co-acting with an azimuth ring 350 which is this form of my invention is represented as stationary and as mounted in suitable brackets 351 wherefrom it is suitably insulated. The said azimuth ring is suitably connected with the steering apparatus of the torpedo in a manner described in connection with other forms of my invention and not herein necessary more fully to disclose.

Inasmuch as through the shaft 334 the gyroscope is mechanically turned in accordance with the orientation of the sighting means 307, I provide suitable means to prevent the precessing of the gyroscope owing to such mechanical turning thereof. While for this purpose any suitable means may be provided, I have herein represented the framing of the torpedo 337 as provided with an annular flange 352 having therein an annular groove 353 receiving the rounded or reduced end of a pin 354 carried by the horizontal gimbal ring 343 and normally projected by a suitable spring into said annular groove, thus permitting the turning of the gyroscope through the shaft 334 in accordance with the orientation of the sighting instrumentality 307.

As the torpedo is discharged, the circuit containing the solenoids 355 is automatically closed through the switch 359, thereby energizing said solenoid, thereby withdrawing the pin 354 from the annular groove 353.

In the foregoing description I have repeatedly referred to the employment of transmitters and repeaters. These may be of any standard or other suitable type. In order, however, that the construction and operation thereof may be fully evident, I have in Figs. 18 and 19 indicated one form of transmitter that may be employed in the practice of my invention and in Figs. 20 and 21 I have indicated one form of repeater that I may employ.

Referring first to the construction of transmitter, I have in Figs. 18 and 19 indicated a transmitter shaft 355 having fast thereon a gear 356 meshing with a pinion 357 fast upon a preferably upright shaft 358 upon which are fixedly positioned any suitable number of cams or like elements. Herein for the purpose I have represented three cams A, B, C, each of which, as indicated most clearly in Fig. 18, has two projections positioned 180° apart, the said cams being so set upon the shaft 358 that some of the projections are positioned 60° apart as shown in Fig. 18. Upon a suitable frame or support 359 are mounted three switches 360, 361, 362, which are adapted to be brought in proper sequence, through action of the proper cam members, into contact with three terminals 363, 364, 365, leading from which are the conductors 366, 367 and 368 extending to the repeater. Extending from the frame 359, which is suitably insulated from its support, is a main conductor 369 in circuit with which is a battery 370. The construction and arrangement of parts are such that upon rotation of the gear 356 in synchronism with the sighting instrumentality, the circuits containing the conductors 366, 367 and 368 are closed in sequence and thereby corresponding circuits in the receiver are closed.

In Figs. 20 and 21 I have indicated somewhat diagrammatically the repeaters. Therein I have indicated a gear 371 fast upon a shaft 372. The said gear 371 is to be turned in synchronism with the gear 356 of the transmitter. For this purpose it is in mesh with a pinion 373 fast upon the shaft 374, the latter having thereon a preferably iron core 375. Surrounding said core are six solenoids indicated respectively at A, A', B, B' and C, C', the number of pairs of solenoids equaling the number of cams A, B, C. The solenoids A, A' are in circuit with conductors 376, 377 extending from which is a conductor 378 in circuit with the conductor 366 leading from the transmitter. Leading from the solenoids B, B' are conductors 379, 380 from which leads a conductor 381 that is in circuit with the conductor 367 leading from the transmitter. Leading from the solenoids C, C' are conductors 382, 383 from which leads a conductor 384 extending to the conductor 368 of the transmitter.

It will be evident from the foregoing description that the successive closing of the circuits having the terminals 363, 364 and 365 effects the successive energization of the pairs of solenoids A, A', B, B' and C, C', with the result that the core 375 and its shaft 374 are turned in synchronism thereby rotating with the shaft 358 the gear 371 in synchronism with the rotation of the gear 356 of the transmitter and to a corresponding extent.

Although I have described in detail one form of transmitter and repeater, it is evident that other suitable forms or other properly functioning devices may be employed instead.

Having thus described certain illustrative embodiments of my invention, I desire it to be understood that although specific terms are employed in the foregoing description, they are used in a generic and descriptive sense, and not for purposes of limitation, the scope of the invention being set forth in the following claims:

Claims:

1. An apparatus for controlling torpedo firing comprising sighting means, a torpedo, a gyroscope for the torpedo, driving means for the gyroscope, electrical means energized upon the discharge of the topedo to disconnect the driving means for the gyroscope, and means controlled by said sighting means to adjust the action of said gyroscope upon the torpedo.

2. An apparatus for controlling torpedo firing comprising sighting means, a torpedo, a gyroscope for the torpedo, driving means for the gyroscope, a solenoid energized upon discharge of the torpedo to disconnect said driving means, and means controlled by said sighting means to adjust the action of said gyroscope upon the torpedo.

3. Apparatus for controlling torpedo firing comprising sighting means, a torpedo, a gyroscope having a rotor and a contact arm, means to synchronize the orientation of said sighting means and contact arm, and including an electric circuit automatically closed on the discharge of the torpedo to stop the driving of the rotor, and means to effect the driving of the gyroscope by the momentum of the said rotor.

4. An apparatus for controlling torpedo firing comprising sighting means, a torpedo, a gyroscope for the torpedo and having a rotor, means including a turbine driven shaft and interposed gearing to drive said rotor, electrical means energized upon the discharge of the torpedo to disconnect the driving means for the gyroscope, and means controlled by said sighting means to adjust the action of said gyroscope upon the torpedo.

5. An apparatus for controlling torpedo firing comprising sighting means, a torpedo having means operatively related thereto and adapted to be synchronized in movement with the sighting means, means for maintaining said synchronized means in its position of synchronization, and means for detachably connecting said latter means and said synchronized means.

6. An apparatus for controlling torpedo firing comprising sighting means, a torpedo having means operatively related thereto and adapted to be synchronized in movement with the sighting means, a gyroscopic compass for maintaining said synchronized means in its position of synchronization, and means for detachably connecting said latter means and said synchronized means.

7. An apparatus for controlling torpedo firing comprising sighting means, a torpedo having direction-maintaining means, means for controlling the action of said direction-maintaining means through the action of said sighting means, and a gyroscopic compass adapted to be detachably connected to said direction maintaining means to maintain it in adjusted position.

8. An apparatus for controlling torpedo firing comprising sighting means, a torpedo, a gyroscope for the torpedo having a rotor, a shaft 17, gearing 19, 20, 28 between said shaft and the rotor, and means actuated upon the discharge of the torpedo to disconnect the driving means for the gyroscope rotor, and means controlled by the sighting means to adjust the action of said gyroscope upon the torpedo.

9. An apparatus for controlling torpedo firing comprising sighting means, a torpedo, a gyroscope for the torpedo having a rotor, driving means for said rotor, means including a solenoid rendered active upon the discharge of the torpedo to disconnect the driving means for the gyroscope rotor, and means controlled by the said sighting means to adjust the action of the gyroscope upon the torpedo.

10. An apparatus for controlling torpedo firing comprising sighting means, a torpedo, a gyroscope for the torpedo and having a rotor, a shaft and interposed gearing for driving said rotor, a contact arm on the torpedo adapted to be synchronized in movement with the sighting means, a solenoid, and means whereby said solenoid causes the disengagement of said gearing upon the discharge of the torpedo.

11. An apparatus for controlling torpedo firing comprising sighting means, a torpedo, a gyroscope for the torpedo and having a rotor, a movable contact arm 35 and a fixed azimuth ring, means to synchronize in movement said contact arm and said sighting means, disengageable means to drive said rotor, an electric circuit, and means to change said circuit substantially upon discharge of the torpedo, thereby to disengage said disengageable means.

In testimony whereof, I have signed my name to this specification, in the presence of two subscribing witnesses.

JOHN HAYS HAMMOND, Jr.

Witnesses:
ROBERT H. KAMMLER,
MAY H. LOWRY.